United States Patent [19]

Nakamura et al.

[11] Patent Number: 4,999,515

[45] Date of Patent: Mar. 12, 1991

[54] RADIATION IMAGE RECORDING AND REPRODUCING METHOD

[75] Inventors: Takashi Nakamura; Kenji Takahashi, both of Kaisei, Japan

[73] Assignee: Fuji Photo Film Co., Ltd., Kanagawa, Japan

[21] Appl. No.: 475,877

[22] Filed: Feb. 6, 1990

Related U.S. Application Data

[60] Division of Ser. No. 336,553, Apr. 11, 1989, abandoned, which is a continuation of Ser. No. 219,848, Jul. 11, 1988, abandoned, which is a continuation of Ser. No. 834,886, Feb. 28, 1986, abandoned, which is a continuation of Ser. No. 660,987, Oct. 15, 1984, abandoned.

[30] Foreign Application Priority Data

Oct. 14, 1983 [JP] Japan ............... 58-193161
Oct. 14, 1983 [JP] Japan ............... 58-193162
Sep. 25, 1984 [JP] Japan ............... 59-200167
Sep. 25, 1984 [JP] Japan ............... 59-200168

[51] Int. Cl.⁵ .................................. G03C 5/16
[52] U.S. Cl. .................... 250/484.1; 250/327.2; 252/301.4 H
[58] Field of Search ............ 252/301.4 H; 250/327.2, 250/484.1

[56] References Cited

U.S. PATENT DOCUMENTS 3,163,608 12/1964 Yocom .................. 252/301.4 H
3,447,097 5/1969 Kiss ..................... 252/301.4 H

FOREIGN PATENT DOCUMENTS 29963 6/1981 European Pat. Off. ...... 252/301.4 H
2642226 3/1978 Fed. Rep. of Germany ... 252/301.4 H Primary Examiner—Jack Cooper
Attorney, Agent, or Firm—Sixbey, Friedman, Leedom & Ferguson

[57] ABSTRACT

A divalent europium activated alkaline earth metal halide phosphor having the formula (I):

$$M^{II}X_2 \cdot aM^{II}X'_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively. A process for the preparation of said phosphor, a radiation image recording and reproducing method utilizing said phosphor, and a radiation image storage panel using said phosphor are also disclosed.

10 Claims, 11 Drawing Sheets

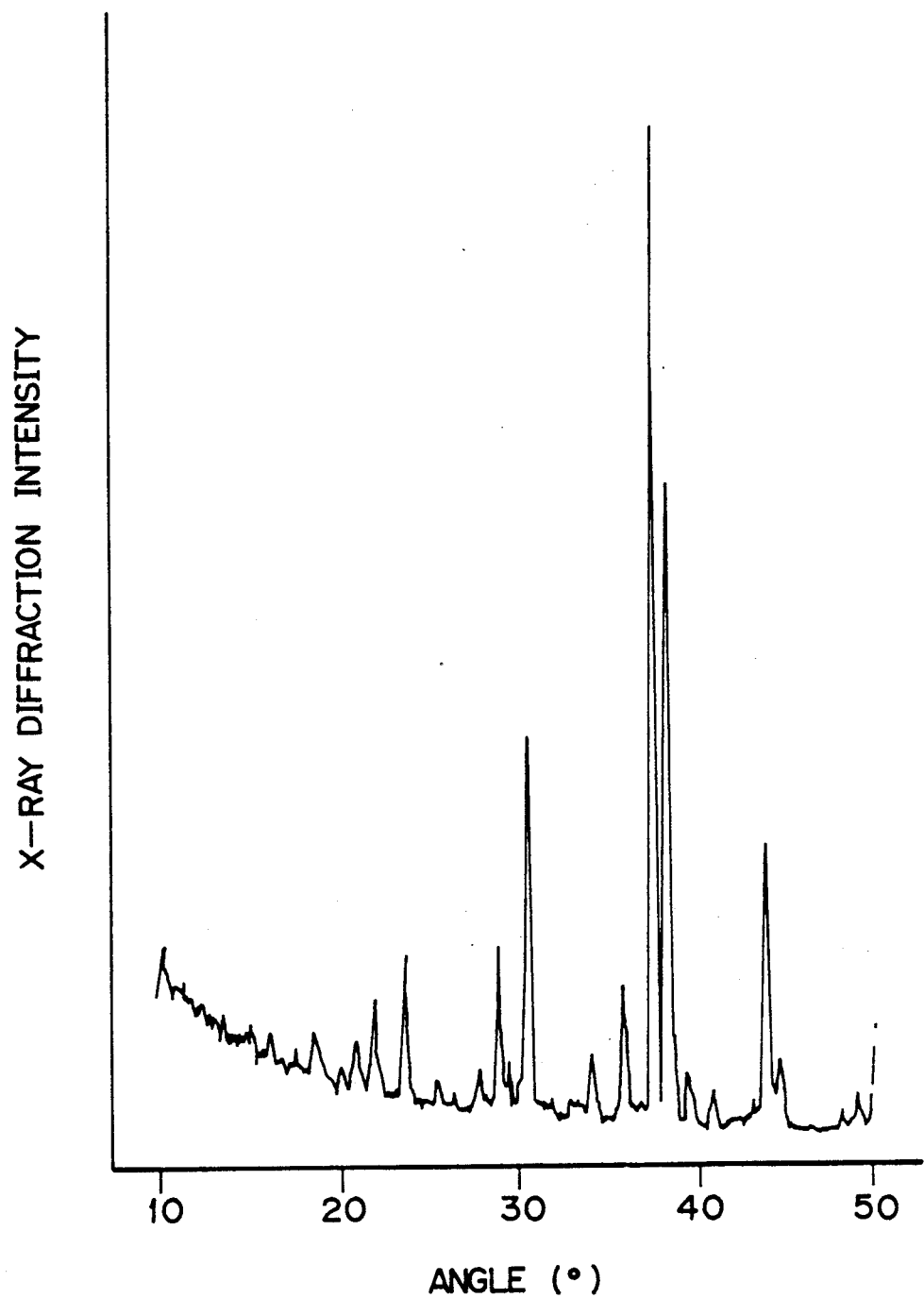
FIG.I (a)

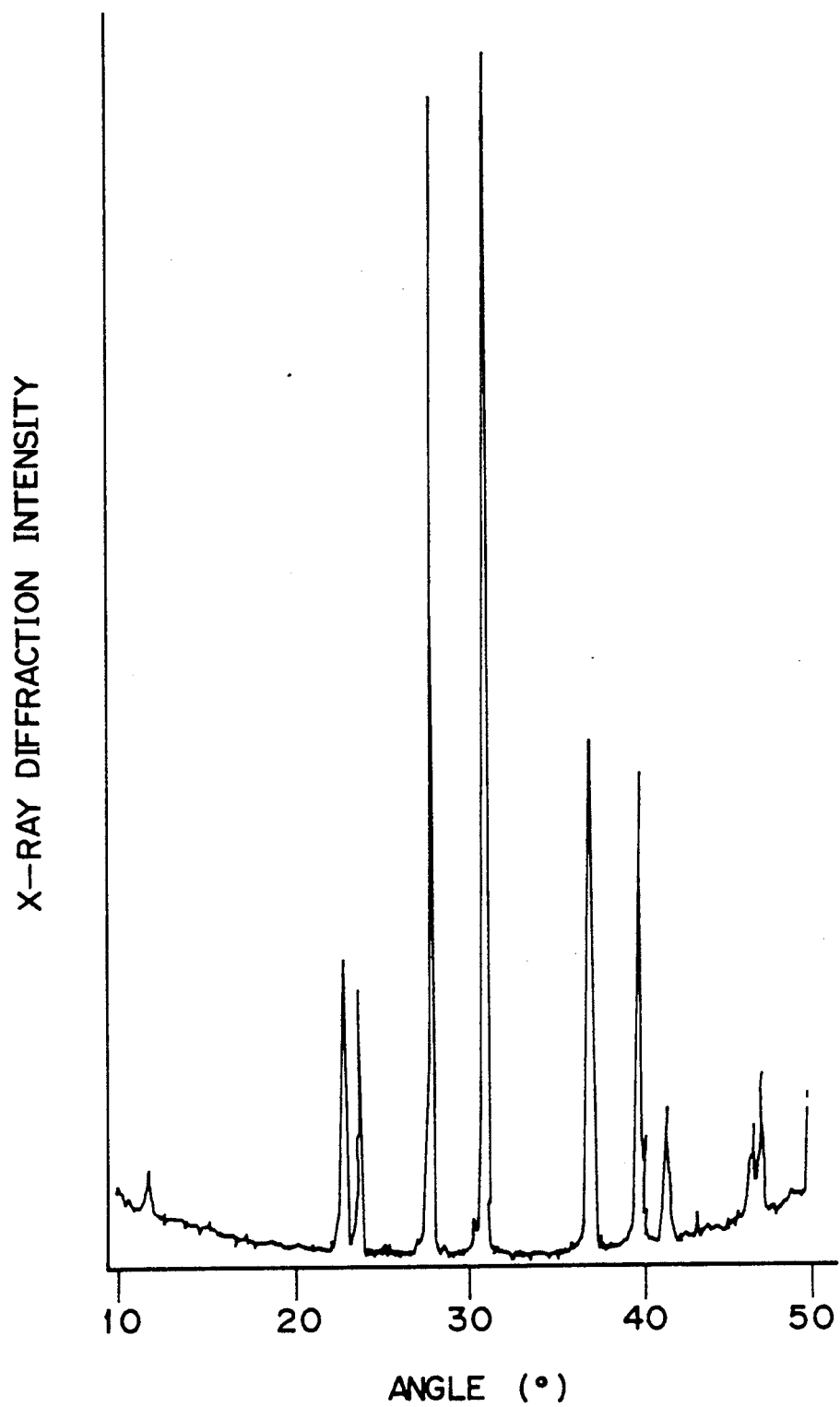
FIG.I (d)

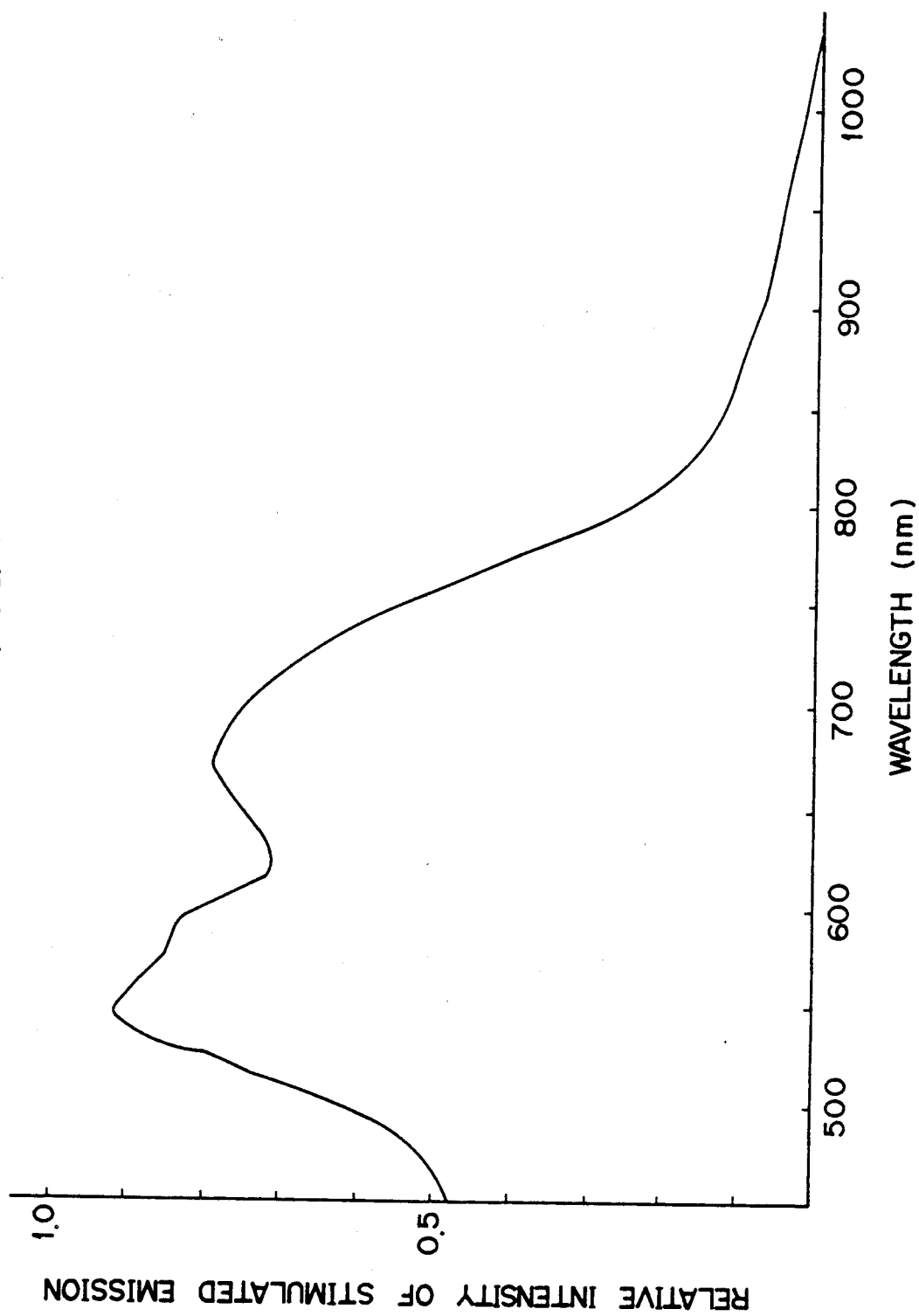

RADIATION IMAGE RECORDING AND REPRODUCING METHOD

This is a divisional application of Ser. No. 07/336,553 filed Apr. 11, 1989, which is a continuation of Ser. No. 07/219,848, filed Jul. 11, 1988, which was a continuation of Ser. No. 06/834,886, filed Feb. 28, 1986, which was a continuation of Ser. No. 06/660,987, filed Oct. 15, 1984, all now abandoned.

BACKGROUND OF THE INVENTION

1. Field of the Invention

The present invention relates to a novel phosphor, a process for the preparation of the same, a radiation image recording and reproducing method utilizing the same, and a radiation image storage panel employing the same. More particularly, the invention relates to a novel divalent europium activated alkaline earth metal halide phosphor.

2. Description of the Prior Art

There is well known a divalent europium activated alkaline earth metal fluorohalide phosphor ($M^{II}FX:Eu^{2+}$, in which $M^{II}$ is at least one alkaline earth metal selected from the group consisting of Ba, Sr and Ca; and X is a halogen other than fluorine), as a divalent europium activated alkaline earth metal halide phosphor. For instance, Japanese Patent Publication No. 51(1976)-28591 discloses that the phosphor gives an emission (spontaneous emission) in the near ultraviolet region when exposed to a radiation such as X-rays, cathode rays or ultraviolet rays, the maximum of the emission being at the wavelength of approx. 390 nm, and the phosphor is useful for a radiographic intensifying screen employable for radiography such as X-ray photography.

Recently, it has been discovered that the divalent europium activated alkaline earth metal fluorohalide phosphor emits light in the near ultraviolet region when excited with an electromagnetic wave such as visible light or infrared rays after exposure to a radiation such as X-rays, cathode rays and ultraviolet rays, that is, the phosphor gives stimulated emission, as disclosed in Japanese Patent Provisional Publication No. 55(1980)-12143. For this reason, the phosphor has been paid much attention as a phosphor for a radiation image storage panel employable in a radiation image recording and reproducing method utilizing a stimulable phosphor.

The radiation image recording and reproducing method can be employed in place of the conventional radiography utilizing a combination of a radiographic film having an emulsion layer containing a photosensitive silver salt and an intensifying screen as described, for instance, in U.S. Pat. No. 4,239,968. The method involves steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, the radiation image recording and reproducing method is of great value, especially when the method is used for medical diagnosis.

As for a stimulable phosphor employable in the radiation image recording and reproducing method, a rare earth element activated alkaline earth metal fluorohalide phosphor such as the above-mentioned divalent europium activated alkaline earth metal fluorohalide phosphor is known, but almost no stimulable phosphor other than this phosphor is known.

SUMMARY OF THE INVENTION

The present invention provides a divalent europium activated alkaline earth metal halide phosphor which is different from the above-mentioned known divalent europium activated alkaline earth metal fluorohalide phosphor, and a process for the preparation of the same. The invention further provides a radiation image recording and reproducing method and a radiation image storage panel employing said phosphor.

Accordingly, a principal object of the present invention is to provide a novel divalent europium activated alkaline earth metal halide phosphor and a process for the preparation of the same.

Another object of the present invention is to provide a radiation image recording and reproducing method utilizing said novel stimulable phosphor and a radiation image storage panel employing the same.

As a result of study, the present inventors have found that a phosphor showing stimulated emission as well as spontaneous emission can be obtained by procedures of mixing at least two compounds (starting materials for a host) selected from the alkaline earth metal halide group consisting of chlorides, bromides and iodides of Ba, Sr and Ca with an europium compound (starting material for an activator) in an appropriate ratio; and firing the obtained mixture at a temperature within the range of 500°–1300° C. in a weak reducing atmosphere.

The phosphor of the invention is a divalent europium activated alkaline earth metal halide phosphor having the formula (I):

$$M^{II}X_2 \cdot aM^{II}X'_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively.

The process for the preparation of the phosphor having the formula (I) of the invention comprises:

mixing starting materials for the phosphor in a stoichiometric ratio corresponding to the formula (II):

$$M^{II}X_2 \cdot aM^{II}X'_2 : xEu \qquad (II)$$

in which $M^{II}$, X, X', a and x have the same meanings as defined above; and firing the obtained mixture at a temperature within the range of 500°–1300° C. in a weak reducing atmosphere.

The divalent europium activated alkaline earth metal halide phosphor having the formula (I) of the present invention gives a stimulated emission in the near ultraviolet to blue region when excited with an electromagnetic wave having a wavelength within the range of 450–1000 nm after exposure to a radiation such as X-rays, ultraviolet rays, cathode rays, γ-rays, α-rays or β-rays.

The phosphor having the formula (I) also gives a spontaneous emission in the near ultraviolet to blue region when excited with a radiation such as X-rays, ultraviolet rays or cathode rays.

On the basis of the stimulated emission characteristics of the novel phosphor as described above, the present inventors have further accomplished the following invention.

That is, the radiation image recording and reproducing method comprises steps of:
  (i) causing the divalent europium activated alkaline earth metal halide phosphor having the above formula (I) to absorb a radiation having passed through an object or having radiated from an object;
  (i) causing a stimulable phosphor to absorb a radiation having passed through an object or having radiated from an object;
  (ii) exposing said stimulable phosphor to an electromagnetic wave having a wavelength within the range of 450–1000 nm to release the radiation energy stored therein as light emission; and
  (iii) detecting the emitted light.

The radiation image storage panel of the invention comprises a support and at least one phosphor layer provided thereon which comprises a binder and a stimulable phosphor dispersed therein, in which at least one phosphor layer contains the divalent europium activated alkaline earth metal halide phosphor having the above formula (I).

BRIEF DESCRIPTION OF THE DRAWINGS

FIGS. 2 shows a stimulation spectrum of the $BaCl_2\cdot BaBr_2:0.001Eu^{2+}$ phosphor.

DETAILED DESCRIPTION OF THE INVENTION

Figure 1:
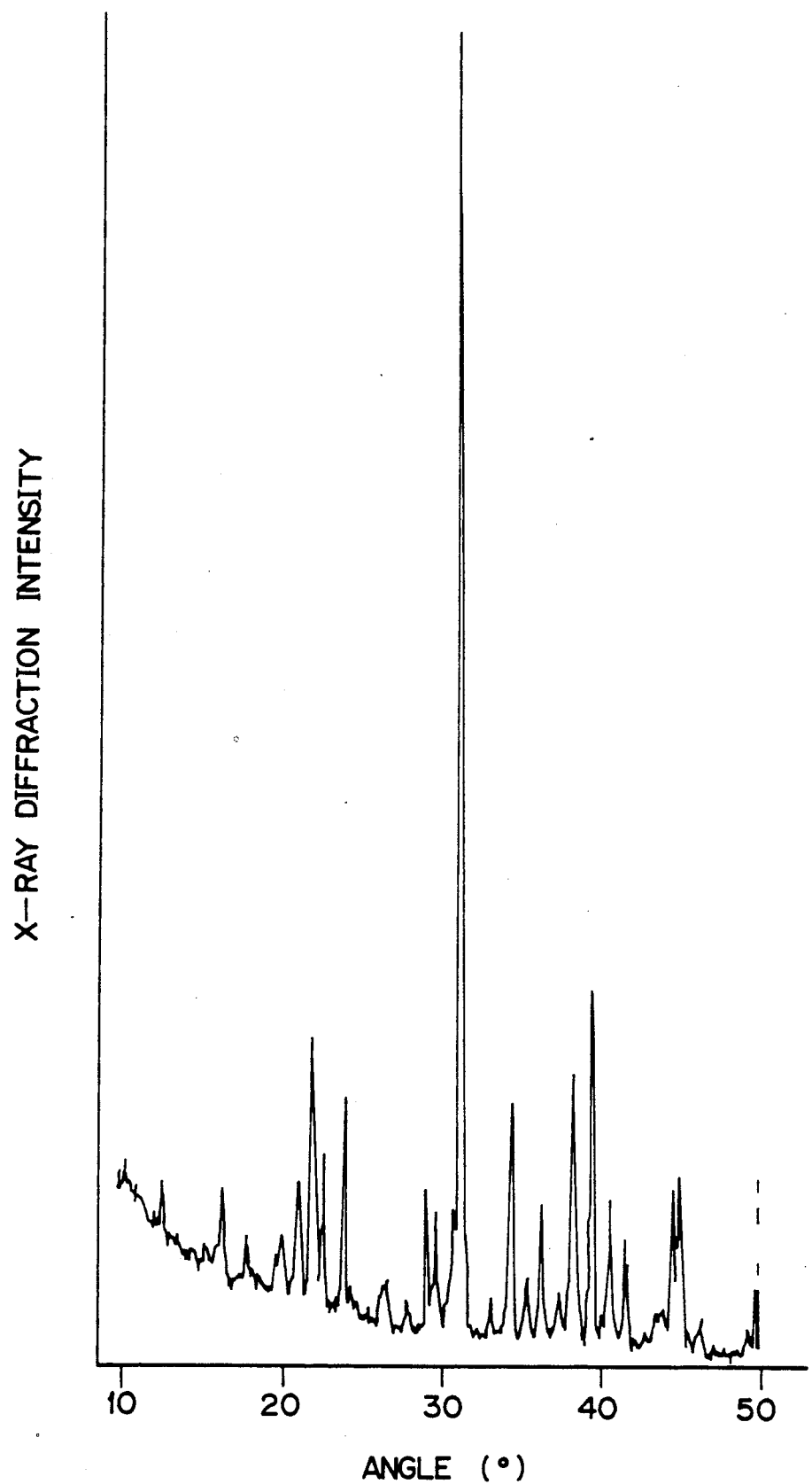
FIG. 1 shows an X-ray diffraction pattern of a $BaCl_2\cdot BaBr_2:0.001Eu^{2+}$ phosphor [(a)], which is an example of the divalent europium activated alkaline earth metal halide phosphor of the present invention, and X-ray diffraction patterns of $BaCl_2$, $BaBr_2$ and the known $BaFBr:0.001Eu^{2+}$ phosphor [(b), (c) and (d), respectively].
Figure 1:
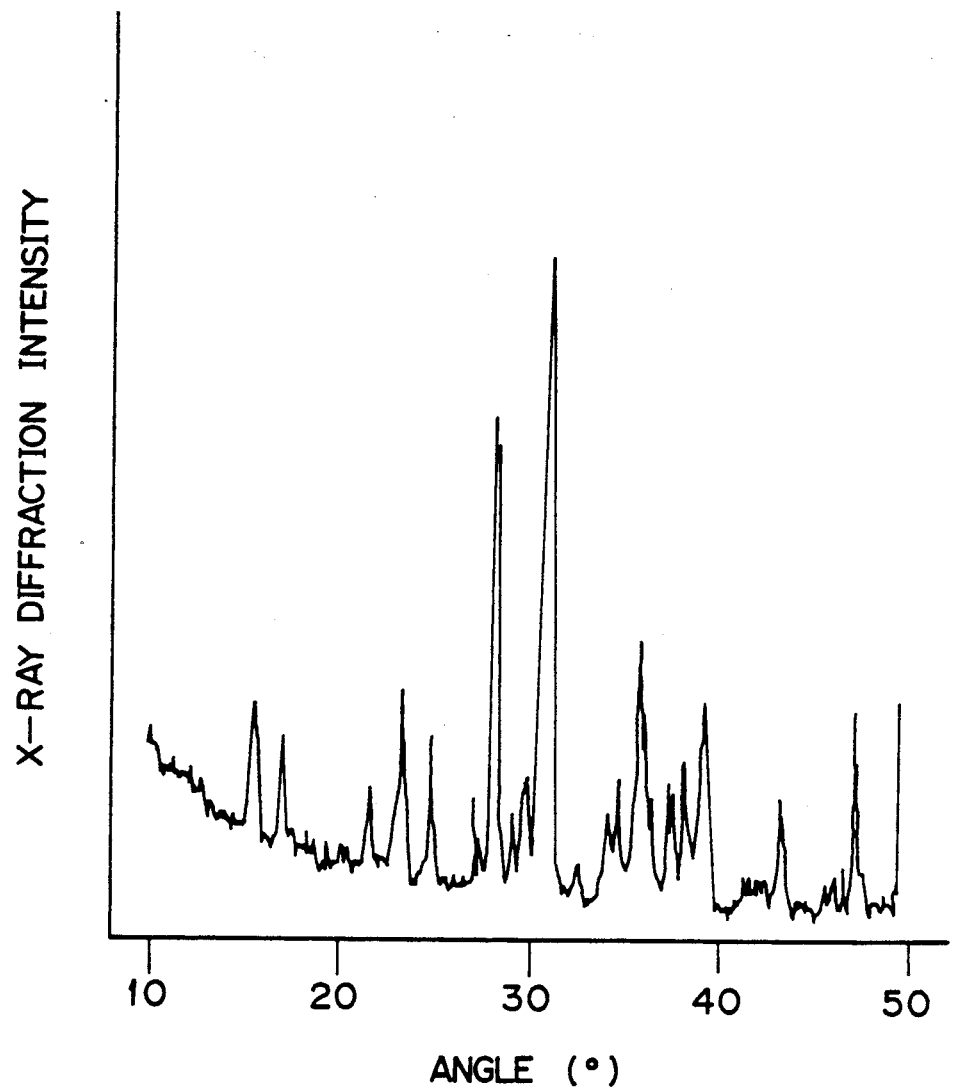

The divalent europium activated alkaline earth metal halide phosphor of the present invention can be prepared, for instance, by a process described below.

As starting materials, the following materials can be employed:
  (1) at least two alkaline earth metal halides selected from the group consisting of $BaCl_2$, $SrCl_2$, $CaCl_2$, $BaBr_2$, $SrBr_2$, $CaBr_2$, $BaI_2$, $SrI_2$ and $CaI_2$; and
  (2) at least one compound selected from the group consisting of europium compounds such as europium halide, europium oxide, europium nitrate and europium sulfate.

The above starting materials (1) are two or more kinds of alkaline earth metal halides having a halogen different from each other. Further, ammonium halide ($NH_4X''$, in which $X''$ is any one of Cl, Br and I) may be employed as a flux.

In the process for the preparation of the phosphor of the invention, the above-mentioned alkaline earth metal halides (1) and europium compound (2) are, in the first place, mixed in the stoichiometric ratio corresponding to the formula (II):

$M^{II}X_2\cdot aM^{II}X'_2:xEu$ (II)

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively.

From the viewpoint of enhancement in the luminance of stimulated emission and in the luminance of spontaneous emission, the number a in the formula (II) which indicates the ratio between $M^{II}X_2$ and $M^{II}X'_2$ is preferably within the range of $0.3 \leq a \leq 3.3$, and more preferably of $0.5 \leq a \leq 2.0$. From the same viewpoint, the number x in the formula (II) which indicates the amount of europium activator is preferably within the range of $10^{-5} \leq x \leq 10^{-2}$.

From the viewpoint of improvement in the afterglow characteristics of spontaneous emission upon excitation with X-rays and of enhancement in the luminance of spontaneous emission and the luminance of stimulated emission, it is preferable that X and X' in the formula (II) are Cl and Br, respectively and that the number a in the formula (II) which indicates the ratio between $M^{II}Cl_2$ and $M^{II}Br_2$ is within the range of $0.25 \leq a \leq 0.8$ or $1.2 \leq a \leq 6.0$. More preferably, the number a is within the range of $0.35 \leq a \leq 0.7$ or $1.4 \leq a \leq 4.0$. From the same viewpoint, $M^{II}$ in the formula (II) preferably is Ba.

The mixture of starting materials for the phosphor the present invention is prepared by any one of the following procedures;
  (i) simply mixing the starting materials (1) and (2);
  (ii) mixing the starting materials (1), heating the obtained mixture at a temperature of not lower than 100° C. for several hours and then mixing the heat-treated mixture with the starting material (2); and (iii) mixing the starting materials (1) in the form of a solution, drying the solution by reduced pressure drying, vacuum drying or spray drying under heating (preferably, 50°-200° C.), and then mixing the obtained dry product with the starting material (2).

Further, as a modification of the above procedure (ii), there may be mentioned a procedure comprising mixing the starting materials (1) and (2) and subjecting the obtained mixture to the heating treatment. As other modification of the procedure (iii), there may be mentioned a procedure comprising mixing the starting materials (1) and (2) in the form of a solution and subjecting the solution to the drying.

The mixing is carried out using a conventional mixing apparatus such as a variety of mixers, a V-type blender, a ball mill and a rod mill in any case of the above-described procedures (i), (ii), (iii).

Then, the resulting mixture of the starting materials is placed in a heat-resistant container such as a quartz boat, an alumina crucible or a quartz crucible, and fired in an electric furnace. The temperature for the firing suitably ranges from 500° to 1300° C., and preferably ranges from 700° to 1000° C. The firing period is determined depending upon the amount of the mixture of starting materials, the firing temperature, etc., and suitably ranges from 0.5 to 8 hours. As the firing atmosphere, there can be employed a weak reducing atmosphere such as a nitrogen gas atmosphere containing a small amount of hydrogen gas or a carbon dioxide gas atmosphere containing carbon monoxide gas. A trivalent europium compound is generally employed as the above-mentioned starting material (2) and in the firing stage, the trivalent europium contained in the mixture is reduced into divalent europium by the weak reducing atmosphere.

Through the firing procedure, a powdery phosphor of the present invention is produced. The powdery phosphor thus obtained may be processed in a conventional manner involving a variety of procedures for the preparation of phosphors such as a washing procedure, a drying procedure and a sieving procedure.

The phosphor of the present invention prepared in accordance with the above-described process is a divalent europium activated alkaline earth metal halide phosphor having the formula (I):

$$M^{II}X_2 \cdot aM^{II}X'_2 : xEu^{2+} \quad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively.

FIG. 1-(a) shows an X-ray diffraction pattern of a divalent europium activated barium chlorobromide phosphor ($BaCl_2 \cdot BaBr_2 : Eu^{2+}$), which is an example of the phosphor prepared by the process of the present invention. FIGS. 1-(b), 1-(c) and 1-(d) show X-ray diffraction patterns for comparison, of barium chloride ($BaCl_2$), barium bromide ($BaBr_2$) and a known divalent europium activated barium fluorobromide (BaFBr:$Eu^{2+}$), respectively. These X-ray diffraction patterns are measured using Cu,K$\alpha_1$ radiation.

As is clear from FIG. 1, the crystal structure of the $BaCl_2 \cdot BaBr_2 : Eu^{2+}$ phosphor of the present invention is quite different from those of $BaCl_2$ and $BaBr_2$ which are starting materials for the phosphor. It is also clear that the crystal structure of the phosphor of the present invention is different from that of the known BaFBr:$Eu^{2+}$ phosphor.

It has been confirmed that such difference of the crystal structure appears in other divalent europium activated alkaline earth metal halide phosphors according to the present invention.

The divalent europium activated alkaline earth metal halide phosphor of the present invention gives stimulated emission in the near ultraviolet to blue region (peak wavelength of the emission: approx. 405 nm) when excited with an electromagnetic wave having a wavelength within the region of 450-1000 nm such as visible light or infrared rays after exposure to a radiation such as X-rays, ultraviolet rays and cathode rays.

FIGS. 2 shows an example of a stimulation spectrum of the divalent europium activated alkaline earth metal halide phosphor of the present invention, that is, a stimulation spectrum of the above-mentioned $BaCl_2 \cdot BaBr_2 : Eu^{2+}$ phosphor.

As is clear from FIG. 2, the $BaCl_2 \cdot BaBr_2 : Eu^{2+}$ phosphor gives stimulated emission upon excitation with an electromagnetic wave in the wavelength region of 450-1000 nm after exposure to a radiation. Particularly, the phosphor exhibits stimulated emission of high intensity upon excitation with an electromagnetic wave in the wavelength region of 500-850 nm. In this case, the emitted light can be easily separated from the stimulating rays. Based on these facts, the wavelength region of an electromagnetic wave employed as stimulating rays, namely 450-1000 nm, has been decided in the radiation image recording and reproducing method of the present invention.

Figure 3:
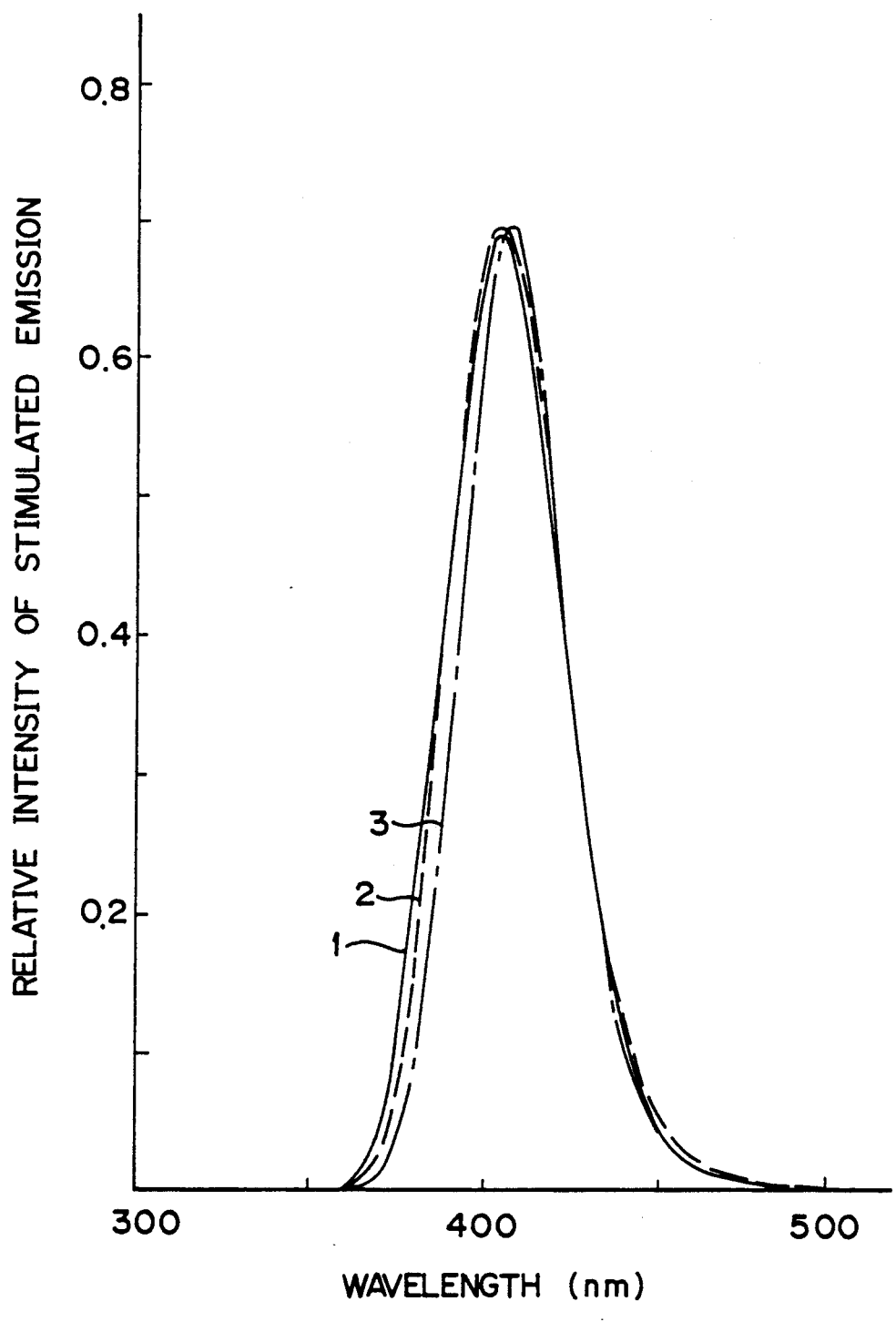
FIGS. 3 shows stimulated emission spectra of the $BaCl_2\cdot BaBr_2:0.001Eu^{2+}$ phosphor, a $BaCl_2\cdot BaI_2:0.001Eu^{2+}$ phosphor and a $BaBr_2\cdot BaI_2:0.001Eu^{2+}$ phosphor (Curves 1, 2 and 3, respectively), which are examples of the divalent europium activated alkaline earth metal halide phosphor of the present invention.

FIGS. 3 shows examples of stimulated emission spectra of the divalent europium activated alkaline earth metal halide phosphors according to the present invention:

Curve 1: stimulated emission spectrum of $BaCl_2 \cdot BaBr_2 : Eu^{2+}$ phosphor;

Curve 2: stimulated emission spectrum of $BaCl_2 \cdot BaI_2 : Eu^{2+}$ phosphor; and Curve 3: stimulated emission spectrum of $BaBr_2 \cdot BaI_2 : Eu^{2+}$ phosphor.

As is clear from FIG. 3, the divalent europium activated alkaline earth metal halide phosphors according to the invention give stimulated emission in the near ultraviolet to blue region, and each peak wavelength of the emission is approx. 405 nm, although it slightly varies depending upon the kinds of phosphors.

The stimulation spectrum and stimulated emission spectra of the divalent europium activated alkaline earth metal halide phosphors according to the present invention are illustrated hereinbefore, for the specific phosphors. However, it has been confirmed that other phosphors according to the present invention show almost the same stimulation spectra and stimulated emission spectra as those of the above-mentioned phosphors. Thus, they have the similar stimulated emission characteristics to the above-mentioned phosphors.

The divalent europium activated alkaline earth metal halide phosphor of the present invention also gives spontaneous emission in the near ultraviolet to blue region upon excitation with a radiation such as X-rays, ultraviolet rays and cathode rays.

Figure 4:
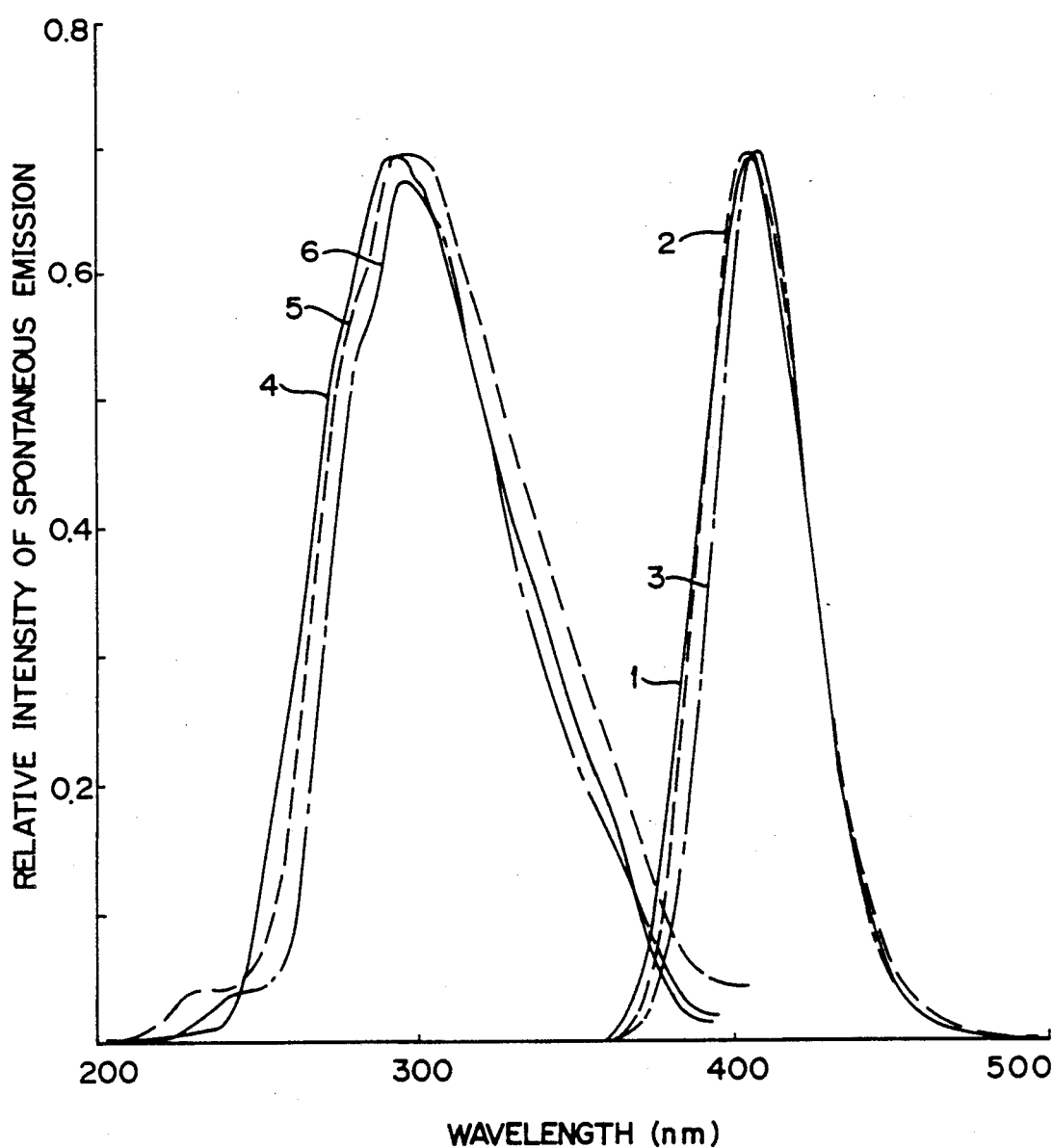
FIG. 4 shows spontaneous emission spectra of the $BaCl_2\cdot BaBr_2:0.001Eu^{2+}$ phosphor, $BaCl_2\cdot BaI_2:0.001Eu^{2+}$ phosphor and $BaBr_2\cdot BaI_2:0.001Eu^{2+}$ phosphor given upon excitation with ultraviolet rays, (Curves 1, 2 and 3, respectively), and excitation spectra thereof (Curves 4, 5 and 6, respectively).

FIG. 4 shows spontaneous emission spectra of a divalent europium activated alkaline earth metal halide phosphors according to the present invention given upon excitation with ultraviolet rays, and excitation spectra thereof:

Curve 1: spontaneous emission spectrum of $BaCl_2 \cdot BaBr_2:Eu^{2+}$ phosphor;
Curve 2: spontaneous emission spectrum of $BaCl_2 \cdot BaI_2:Eu^{2+}$ phosphor;
Curve 3: spontaneous emission spectrum of $BaBr_2 \cdot BaI_2:Eu^{2+}$ phosphor;
Curve 4: excitation spectrum of $BaCl_2 \cdot BaBr_2:Eu^{2+}$ phosphor;
Curve 5: excitation spectrum of $BaCl_2 \cdot BaI_2:Eu^{2+}$ phosphor; and
Curve 6: excitation spectrum of $BaBr_2 \cdot BaI_2:Eu^{2+}$ phosphor.

As is clear from FIG. 4, the divalent europium activated alkaline earth metal halide phosphors according to the present invention give spontaneous emission in the near ultraviolet to blue region upon excitation with ultraviolet rays, having the peak wavelength at approx. 405 nm. The spontaneous emission spectra shown in FIG. 4 are almost the same as the stimulated emission spectra shown in FIG. 3.

Figure 5:
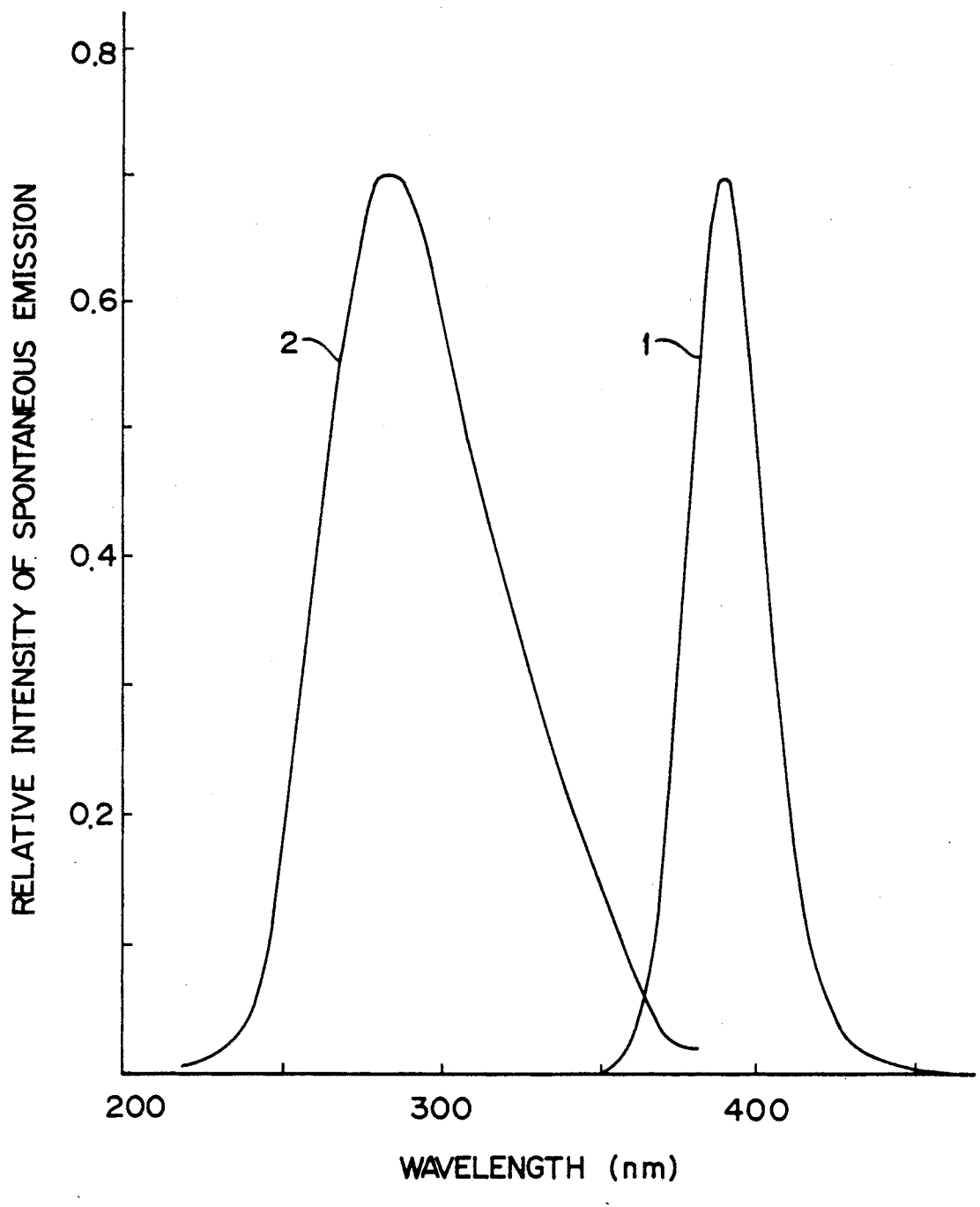
FIG. 5 shows a spontaneous emission spectrum of the known $BaFBr:0.001Eu^{2+}$ phosphor given upon excitation with ultraviolet rays (Curve 1) and an excitation spectrum thereof (Curve 2).

FIG. 5 shows a spontaneous emission spectrum of $BaFBr:Eu^{2+}$ phosphor given upon excitation with ultraviolet rays (Curve 1), which is one example of the aforementioned known $M^{II}FX:Eu^{2+}$ phosphor, and an excitation spectrum thereof (Curve 2). From FIGS. 4 and 5, it is clear that each of the spontaneous emission spectra and excitation spectra of the phosphors according to the present invention wholly shifts to the longer wavelength side as compared with the spontaneous emission spectrum and excitation spectrum of $M^{II}FX:Eu^{2+}$ phosphor, respectively.

The spontaneous emission spectrum upon excitation with ultraviolet rays and the excitation spectrum of the divalent europium activated alkaline earth metal halide phosphor of the invention are illustrated above with respect to the three kinds of phosphors. Also has been confirmed that spontaneous emission spectra and excitation spectra of other phosphors according to the present invention are almost the same as those of the above-stated three kinds of phosphors. It has been further confirmed that the spontaneous emission spectrum of the phosphor of the invention given upon excitation with X-rays or cathode rays are almost the same as those given upon excitation with ultraviolet rays which are shown in FIG. 4.

Figure 6:
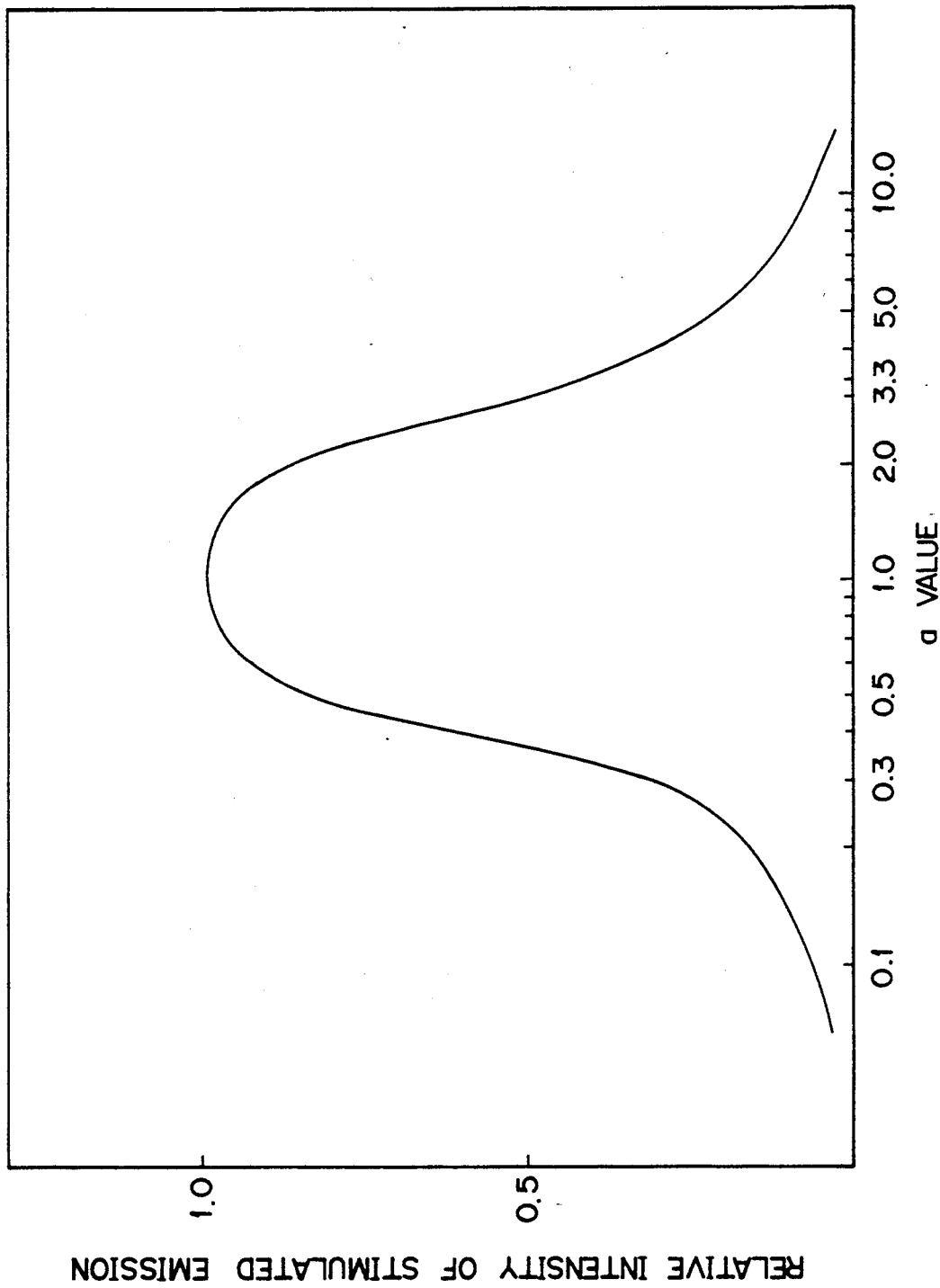
FIG. 6 shows a relationship between a value and an intensity of stimulated emission upon excitation at 632.8 nm with respect to the $BaCl_2\cdot aBaBr_2:0.001Eu^{2+}$ phosphor.

FIG. 6 graphically shows a relationship between a value and an intensity of stimulated emission [emission intensity upon excitation with He-Ne laser beam (wavelength: 632.8 nm) after exposure to X-rays at 80 KVp] with respect to $BaCl_2 \cdot aBaBr_2:Eu^{2+}$ phosphor. As is evident from FIG. 6, the $BaCl_2 \cdot aBaBr_2:Eu^{2+}$ phosphor having a value within a range of $0.1 \leq a \leq 10.0$ gives stimulated emission. On the basis of this fact, the a value range of the divalent europium activated alkaline earth metal halide phosphor of the invention, namely $0.1 \leq a \leq 10.0$, has been decided. Among the $BaCl_2 \cdot aBaBr_2:Eu^{2+}$ phosphor of the present invention having a value within the range of $0.1 \leq a \leq 10.0$, the phosphor having a value within a range of $0.3 \leq a \leq 3.3$ gives stimulated emission of higher intensity, and particularly, the phosphor having a value within a range of $0.5 \leq a \leq 2.0$ gives stimulated emission of much higher intensity.

It has been confirmed that the $BaCl_2 \cdot aBaBr_2:Eu^{2+}$ phosphor has the same tendency as shown in FIG. 6 with respect to the relationship between a value and an intensity of spontaneous emission. Further, it has been confirmed that phosphors according to the present invention other than the $BaCl_2 \cdot aBaBr_2:Eu^{2+}$ phosphor have the same tendencies in the relationships between a value and the intensity of stimulated emission and between a value and the intensity of spontaneous emission as shown in FIG. 6.

Figure 7:
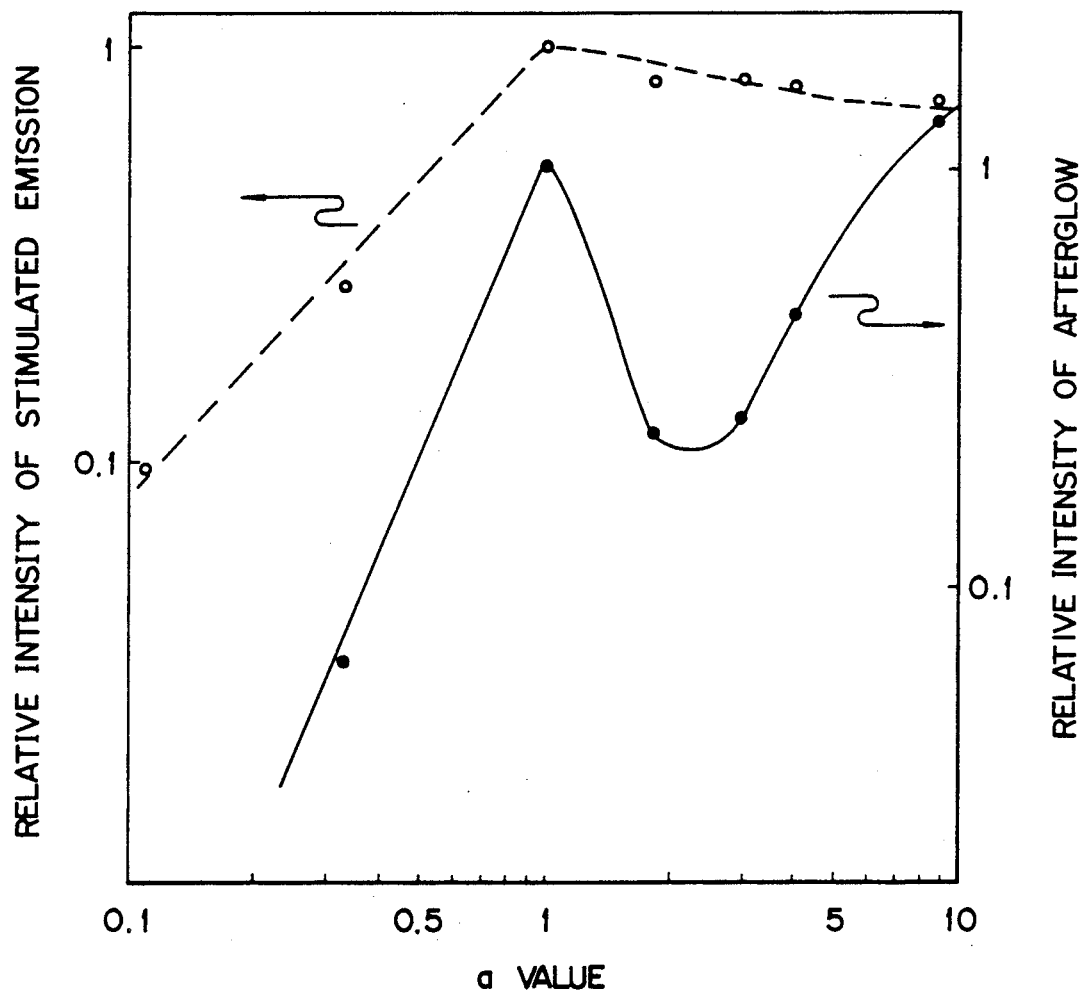
FIG. 7 shows relationships between a value and an intensity of stimulated emission upon excitation at 780 nm (dotted line curve) and between a value and an intensity of afterglow after termination of excitation with X-rays (solid line curve) with respect to the $BaCl_2\cdot aBaBr_2:0.001Eu^{2+}$ phosphor.

Further, a divalent europium activated alkaline earth metal chlorobromide phosphor $(M^{II}Cl_2 \cdot aM^{II}Br_2:Eu^{2+})$ which is included in the phosphor of the invention has the afterglow characteristics as shown in FIG. 7. In this specification, the afterglow is one given after terminating the excitation with a radiation such as X-rays, that is, an afterglow of spontaneous emission.

FIG. 7 shows relationships between a value and an intensity of afterglow when excited with X-rays (full line curve) and between a value and an intensity of stimulated emission [emission intensity upon excitation with semiconductor laser beam (wavelength: 780 nm) after exposure to X-rays at 80 KVp] (dotted line curve) with respect to the $BaCl_2 \cdot aBaBr_2:0.001Eu^{2+}$ phosphor.

The afterglow which is given by a phosphor after termination of exposure to a radiation such as X-rays to excite it often brings about decrease of signal-to-noise ratio of an image provided by a radiographic intensifying screen or a radiation image storage panel employing the phosphor. Accordingly, it is desired that the afterglow of spontaneous emission given by the phosphor upon excitation with X-rays is as small as possible.

When the phosphor is employed in the form of a radiographic intensifying screen in the conventional radiography or in the form of a radiation image storage panel in the radiation image recording and reproducing method, the screen or panel can be repeatedly used. For example, the conventional radiography is continuously performed changing only a radiographic film under an intensifying screen fixed to a cassette, so that the afterglow of the phosphor contained in the screen which is produced in the previous use causes decrease the S/N ratio of the obtained image.

In the radiation image recording and reproducing method, image information is obtained by exposing the panel to a radiation to store the radiation energy therein and then irradiating the panel with stimulating rays (e.g., scanning the panel with laser beam) to sequentially read out stimulated emission. When the reading out of the panel is carried out immediately after exposure to the radiation, the afterglow of the phosphor contained in the panel which is continuously given after terminating the exposure causes decrease the S/N ratio of the obtained image.

As is evident from FIG. 7, the $BaCl_2 \cdot aBaBr_2:Eu^{2+}$ phosphor having a value within ranges of $0.25 \leq a \leq 0.8$ and $1.2 \leq a \leq 6.0$ shows an afterglow of lower intensity, that is, being improved in the afterglow characteristics. Further, the $BaCl_2 \cdot aBaBr_2:Eu^{2+}$ phosphor having a value within ranges of $0.35 \leq a \leq 0.7$ and $1.4 \leq a \leq 4.0$ shows the afterglow of remarkably low intensity as well as shows stimulation emission of high intensity. Particularly, in the phospohr having a value within the range of $1.4 \leq a \leq 4.0$, not only the afterglow after terminating the exposure to X-rays is reduced to remarkably lower level, but also the intensity of stimulated emission upon excitation with the electromagnetic wave having the long wavelength of 780 nm after exposure to X-rays is kept in the high level.

Also has been confirmed that the $BaCl_2 \cdot aBaBr_2:Eu^{2+}$ phosphor having a value within the above-mentioned ranges shows the afterglow of reduced intensity without not so decreasing the intensity of the emission, when the phosphor is excited with X-rays.

From the viewpoint of emission properties described above, the phosphor of the invention is very useful as a phosphor for the use in a radiation image storage panel employed in the radiation image recording and reproducing method or for a radiographic intensifying screen employed in the conventional radiography, both panel and screen being used in medical radiography such as X-ray photography for medical diagnosis and industrial radiography for non-destructive inspection.

Particularly in the case of employing the phosphor of the invention in the radiation image recording and reproducing method, it is possible to vary the wavelength of stimulating rays for exciting the phosphor because of the wide wavelength region of its stimulation spectrum, namely 450–1000 nm. It means that a source of stimulating rays can be suitably selected according to the purpose. For example, a semiconductor laser (having a wavelength in the infrared region) which is in a small size and needs only weak driving power can be employed as the source of stimulating rays, and accordingly the system for performing the method can be made compact. From the viewpoint of the intensity of stimulated emission and of the separation on wavelength between the emitted light and stimulation rays, the stimulating rays are preferred to be an electromagnetic wave having a wavelength within the range of 500–850 nm.

The divalent europium activated alkaline earth metal halide phosphor having the formula (I), which has the aforementioned crystal structure and emission characteristics, is preferably employed in the form of a radiation image storage panel (also referred as a stimulable phosphor sheet) in the radiation image recording and reproducing method of the invention. The radiation image storage panel comprises a support and at least one phosphor layer provided on one surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical shock.

In the radiation image recording and reproducing method employing the stimulable phosphor having the formula (I) in the form of a radiation image storage panel a radiation having passed through an object or radiated from an object is absorbed by the phosphor layer of the panel to form a radiation image as a radiation energy-stored image on the panel. The panel is then excited (e.g., scanned) with an electromagnetic wave in the wavelength region of 450–1000 nm to release the stored image as stimulated emission. The emitted light is photoelectrically detected to obtain electric signals so that the radiation image of the object can be reproduced as a visible image from the obtained electric signals.

The radiation image recording and reproducing method of the present invention will be described in more detail with respect to an example of a radiation image storage panel containing the stimulable phosphor having the formula (I), by referring to a schematic view shown in FIG. 8.

Figure 8:
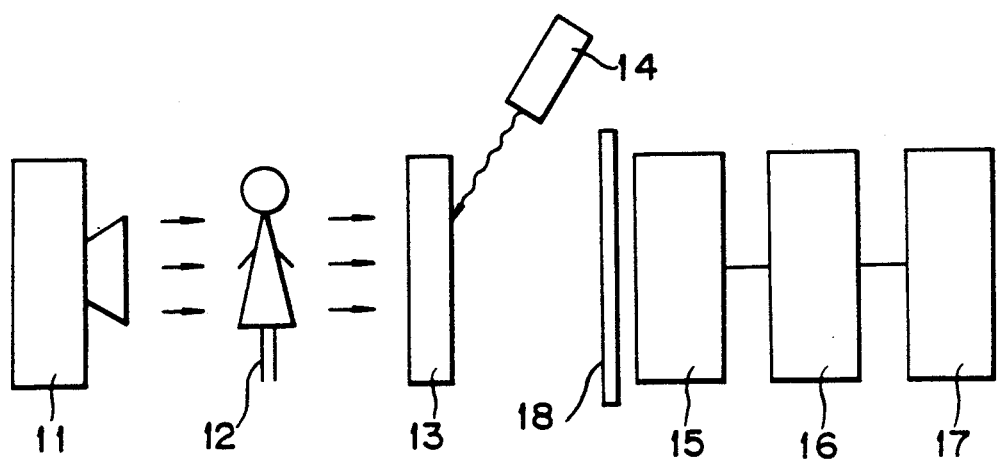
FIG. 8 is a schematic view showing the radiation image recording and reproducing method according to the present invention.

In FIG. 8 which shows the total system of the radiation image recording and reproducing method of the invention, a radiation generating device 11 such as an X-ray source provides a radiation for irradiating an object 12 therewith; a radiation image storage panel 13 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the light emitted by the panel 13 to pass through.

FIG. 8 illustrates an example of the system according to the method of the invention employed for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Referring to FIG. 8, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 is formed on the panel 13.

Thereafter, when the radiation image storage panel 13 is irradiated with an electromagnetic wave having the wavelength within the range of 450–1000 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The operation of reading out the image information stored in the radiation image storage panel is generally carried out by sequentially scanning the panel with laser beam and detecting the light emitted under the scanning with a photosensor such as photomultiplier through a light guiding means to obtain electric signals. In order to obtain a well readable visible image, the read-out operation may comprise a preliminary read-out operation of irradiating the panel with stimulating rays having energy lower than that in a final read-out operation and the final read-out operation of irradiating the panel with stimulating rays (see: Japanese Patent Provisional Publication No. 58(1983)-67240). The read-out condition in the final read-out operation can be suitably set based on the result obtained by the preliminary read-out operation.

As the photosensor, solid-state photoelectric conversion devices such as a photoconductor and a photodiode can be also used (see: Japanese Patent Application No. 58(1983)-86226, No. 58(1983)-86227, No. 58(1983)-219313 and No. 58(1983)-219314, and Japanese Patent Provisional Publication No. 58(1983)-121874). For example, the photosensor is divided into a great number of pixels, which may be combined with a radiation image storage panel or positioned in the vicinity of the panel. Otherwise, the photosensor may be a linesensor in which plural pixels are linearly connected or may be such one that corresponds to one pixel.

In the above-mentioned cases, there may be employed for the source of stimulating rays a linear light source such as an array in which light emitting diodes (LED), semiconductor lasers or the like are linearly arranged, in addition to a point light source such as a laser. The read-out using such photosensor can prevent loss of the light emitted by a panel and can bring about the enhancement of S/N ratio of the image, because the photosensor can receive the emitted light with a large angle. It is also possible to enhance the read-out speed, because electric signals are sequentially obtained not by scanning the panel with stimulating rays, but by electrical processing of the photosensor.

After reading out the image information stored in a radiation image storage panel, the panel is preferably subjected to a procedure of erasing the radiation energy remaining therein, that is, to the exposure to light having a wavelength in the wavelength region of stimulating rays for the phosphor contained therein or to heating (see: Japanese Patent Provisional Publication No. 56(1981)-11392 and No. 56(1981)-12599). It can prevent the occurring of noise due to the after image in the next use of the panel by carrying out the erasing procedure. Further, the panel can be more effectively prevented from the occurrence of noise attributable to natural radiations by carrying out the erasing procedure two times, namely after the read-out and just before the next use (see: Japanese Patent Provisional Publication No. 57(1982)-116300).

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to serve as an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 450-1000 nm; and light sources providing light having a single wavelength or more in said region such as an Ar ion laser, a Kr ion laser, a He-Ne laser, a ruby laser, a semiconductor laser, a glass laser, a YAG laser, a dye laser and a light emitting diode. Among the above-mentioned sources of stimulating rays, the lasers are preferred because the radiation image storage panel is exposed thereto with a high energy density per unit area. Particularly preferred are a He-Ne laser and an Ar ion laser. The semiconductor laser is also preferred, because its size is small, it can be driven by a weak electric power and its output power can be easily stabilized because of the direct modulation thereof.

As the light source for erasing the radiation energy remaining in the radiation image storage panel, a light source at least providing light of a wavelength within the wavelength region of stimulating rays for the above-mentioned phosphor is employed. Examples of the light source employable in the method of the present invention include a fluorescent lamp, a tungsten lamp and a halogen lamp as well as the above-mentioned sources of stimulating rays.

The recording and read-out of a radiation image in the method of the invention can be carried out by using a built-in type radiation image conversion apparatus which comprises a recording section for recording the radiation image on the radiation image storage panel (i.e., causing a stimulable phosphor of the panel to absorb and store radiation energy), a read-out section for reading out the radiation image recorded on the panel (i.e., irradiating the phosphor with stimulating rays to release the radiation energy as light emission), and an erasure section for eliminate the radiation image remained in the panel (i.e., causing the phosphor to release the remaining energy) (see: Japanese Patent Application No. 57(1982)-84436 and No. 58(1983)-66730). By employing such built-in type apparatus, the radiation image storage panel (or a recording medium containing a stimulable phosphor) can be circularly and repeatedly used and a number of images having a quality at a certain level can be stably obtained. The radiation image conversion apparatus can be made so compact and light weight as to easily set and move the apparatus. It is further possible to move the apparatus place to place to record the radiation images for mass examinations by loading a traveling X-ray diagnosis station in the form of a vehicle like a bus with the apparatus.

The radiation image storage panel employable in the radiation image recording and reproducing method of the invention will be described.

The radiation image storage panel, as described hereinbefore, comprises a support and at least one phosphor layer provided thereon which comprises a binder and the above-described divalent europium activated alkaline earth metal halide phosphor having the formula (I) dispersed therein.

The radiation image storage panel having such structure can be prepared, for instance, in the manner described below.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

The phosphor layer can be formed on a support, for instance, by the following procedure.

In the first place, the stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiogaphic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided.

As described in U.S. patent application Ser. No. 496,278 (the whole content of which is described in European Patent Publication No. 92241), the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of radiation image, and the constitution of those protruded and depressed portions can be selected depending on the purpose of the radiation image storage panel.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned divalent europium activated alkaline earth metal halide phosphor having the formula (I), and the plural layers may be placed in such a manner that a layer nearer to the surface shows stimulated emission of higher intensity. In any case, that is, in either the single phosphor layer or plural phosphor layers, a variety of known stimulable phosphors are employable in combination with the above-mentioned stimulable phosphor.

Examples of the stimulable phosphor employable in combination with the aforementioned stimulable phosphor in the radiation image storage panel of the present invention include the aforementioned $M^{II}FX:Eu^{2+}$ phosphor and the phosphors described below;

$ZnS:Cu,Pb$, $BaO \cdot xAl_2O_3:Eu$, in which x is a number satisfying the condition of $0.8 \leq x \leq 10$, and $M^{II}O \cdot xSiO_2:A$, in which $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the present invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

The radiation image storage panel of the present invention may be colored with an appropriate colorant to improve the sharpness of the image provided thereby, as described in European Patent Publication No. 0021174 and Japanese Patent Provisional Publication No. 57(1982)-96300. For the same purpose, white powder may be dispersed in the phosphor layer of the panel as described in Japanese Patent Provisional Publication No. 55(1980)-140447.

The present invention will be illustrated by the following examples, but these examples by no means restrict the invention.

EXAMPLE 1

To 800 ml of distilled water ($H_2O$) were added 333.2 g. of barium bromide ($BaBr_2.2H_2O$), 244.3 g. of barium chloride ($BaCl_2.2H_2O$) and 0.783 g. of europium bromide ($EuBr_3$), and they were mixed to obtain an aqueous solution. The aqueous solution was dried at 60° C. under reduced pressure for 3 hours and further dried at 150° C. under vacuum for another 3 hours to obtain a mixture of the starting materials for the preparation of a phosphor.

The mixture thus obtained was placed in an alumina crusible, which was, in turn, placed in a high-temperature electric furnace. The mixture was then fired at 900° C. for 1.5 hours under a carbon dioxide atmosphere containing carbon monoxide. After the firing was complete, the crusible was taken out of the furnace and allowed to stand for cooling. Thus, a powdery divalent europium activated barium chlorobromide phosphor ($BaCl_2 \cdot BaBr_2:0.001Eu^{2+}$) was obtained.

EXAMPLE 2

The procedure of Example 1 was repeated except for using 427.2 g. of barium iodide ($BaI_2 \cdot 2H_2O$) instead of barium bromide, to obtain a powdery divalent europium activated barium chloroiodide phosphor ($BaCl_2 \cdot BaI_2:0.001Eu^{2+}$).

EXAMPLE 3

The procedure of Example 1 was repeated except for using 427.2 g. of barium iodide ($BaI_2 \cdot 2H_2O$) instead of barium chloride, to obtain a powdery divalent europium activated barium bromoiodide phosphor ($BaBr_2 \cdot BaI_2:0.001Eu^{2+}$)

The phosphors prepared in Examples 1 through 3 were excited with ultraviolet rays to measure spontaneous emission spectra and excitation spectra.

The results are shown in FIG. 4.

In FIG. 4, Curves 1 to 6 correspond to the following specta:

1: spontaneous emission spectrum of $BaCl_2 \cdot BaBr_2:0.001Eu^{2+}$ phosphor (Example 1);
2: spontaneous emission spectrum of $BaCl_2 \cdot BaI_2:0.001Eu^{2+}$ phosphor (Example 2);
3: spontaneous emission spectrum of $BaBr_2 \cdot BaI_2:0.001Eu^{2+}$ phosphor (Example 3);
4: excitation spectrum of $BaCl_2 \cdot BaBr_2:0.001Eu^{2+}$ phosphor (Example 1);
5: excitation spectrum of $BaCl_2 \cdot BaI_2:0.001Eu^{2+}$ phosphor (Example 2); and
6: excitation spectrum of $BaBr_2 \cdot BaI_2:0.001Eu^{2+}$ phosphor (Example 3).

The phosphors prepared in Examples 1 through 3 were excited to X-rays to evaluate the intensity of spontaneous emission.

The results on the evaluation of the phosphors are set forth in Table 1, in which the result on the known $BaFBr:0.001Eu^{2+}$ phosphor given upon the same excitation is also set forth for comparison.

TABLE 1

| Example | Relative Intensity of Spontaneous Emission |
|---|---|
| 1 | 100 |
| 2 | 260 |
| 3 | 290 |
| BaFBr: $0.001Eu^{2+}$ phosphor | 100 |

Further, the phosphors prepared in Examples 1 through 3 were excited with an He-Ne laser (oscillation wavelength: 632. 8 nm) after exposure to X-rays at 80 KVp, to measure stimulated emission spectra. The results are shown in FIG. 3.

In FIG. 3, Curves 1 to 3 correspond to the following spectra:

1: stimulated emission spectrum of $BaCl_2 \cdot BaBr_2:0.001Eu^{2+}$ phosphor (Example 1);
2: stimulated emission spectrum of $BaCl_2 \cdot BaI_2:0.001Eu^{2+}$ phosphor (Example 2);
3: stimulated emission spectrum of $BaBr_2 \cdot BaI_2:0.001Eu^{2+}$ phosphor (Example 3);

The phosphor prepared in Example 1 was excited with light whose wavelength was varied in the range of 450–1100 nm after exposure to X-rays at 80 KVp, to measure stimulation spectrum at the emission wavelength of 405 nm. The results are shown in FIG. 2.

Furthermore, the phosphors prepared in Examples 1 through 3 were excited with light of 780 nm after exposure to X-rays at 80 KVp, to evaluate the intensity of stimulated emission.

The results on the evaluation of the phosphors are set forth in Table 2, in which the result on the known BaFBr:0.001Eu$^{2+}$ phosphor given under the same conditions is also set forth for comparison.

TABLE 2

| Example | Relative Intensity of Stimulated Emission |
|---|---|
| 1 | 700 |
| 2 | 70 |
| 3 | 70 |
| BaFBr: 0.001Eu$^{2+}$ phosphor | 100 |

EXAMPLES 4–9

The procedure of Example 1 was repeated except for using barium chloride and barium bromide at the amounts set forth in Table 3, respectively, to obtain a variety of powdery divalent europium activated barium chlorobromide phosphor (BaCl$_2$·aBaBr$_2$:0.001Eu$^{2+}$).

TABLE 3

| Example | Barium Bromide | Barium Chloride | Obtained Phosphor |
|---|---|---|---|
| 4 | 66.6 g | 439.7 g | BaCl$_2$ · 0.11BaBr$_2$: 0.001Eu$^{2+}$ |
| 5 | 166.6 g | 366.5 g | BaCl$_2$ · 0.33BaBr$_2$: 0.001Eu$^{2+}$ |
| 6 | 433.2 g | 171.0 g | BaCl$_2$ · 1.9BaBr$_2$: 0.001Eu$^{2+}$ |
| 7 | 499.8 g | 122.2 g | BaCl$_2$ · 3.0BaBr$_2$: 0.001Eu$^{2+}$ |
| 8 | 533.1 g | 97.7 g | BaCl$_2$ · 4.0BaBr$_2$: 0.001Eu$^{2+}$ |
| 9 | 599.8 g | 48.9 g | BaCl$_2$ · 9.0BaBr$_2$: 0.001Eu$^{2+}$ |

The phosphors prepared in Example 1 and Examples 4 through 9 were measured on the intensity of afterglow at 10 sec. after exposure to X-rays at 80 KVp. The phosphors were also measured on the intensity of stimulated emission when excited with a semiconductor laser (780 nm) after exposure to X-rays at 80 KVp.

The results are graphically shown in FIG. 7.

In FIG. 7, the solid line curve shows a relationship between a value and an intensity of afterglow after termination of excitation with X-rays and the dotted line curve shows a relationship between a value and an intensity of stimulated emission with respect to the BaCl$_2$·aBaBr$_2$:0.001Eu$^{2+}$ phosphor.

As is evident from FIG. 7, the BaCl$_2$·aBaBr$_2$:Eu$^{2+}$ phosphor having a value within ranges of $0.25 \leq a \leq 0.8$ and $1.2 \leq a \leq 6.0$ showed an afterglow of reduced intensity. Further, the BaCl$_2$·aBaBr$_2$:Eu$^{2+}$ phosphor having a value within ranges of $0.35 \leq a \leq 0.7$ and $1.4 \leq a \leq 4.0$ showed the afterglow of noticeably low intensity without not so decreasing the intensity of stimulated emission, as compared with the BaCl$_2$·BaBr$_2$:Eu$^{2+}$ phosphor (a=1, Example 1).

Particularly, the phosphor having a value within the range of $1.4 \leq a \leq 4.0$ gave stimulated emission of high intensity upon excitation at the wavelength of 780 nm and was reduced on the afterglow to a noticeably low level.

EXAMPLE 10

To a mixture of the powdery divalent europium activated barium chlorobromide phosphor (BaCl$_2$·BaBr$_2$:0.001Eu$^{2+}$) obtained in Example 1 and a linear polyester resin were added successively methyl ethyl ketone and nitrocellulose (nitrification degree: 11.5%), to prepare a dispersion containing the phosphor and the binder (10:1, by weight). Subsequently, tricresyl phosphate, N-butanol and methyl ethyl ketone were added to the dispersion. The mixture was sufficiently stirred by means of a propeller agitater to obtain a homogeneous coating dispersion having a viscosity of 25–35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

The radiation image storage panel prepared in Example 10 was measured on the sensitivity (i.e., intensity of stimulated emission) when excited with light of 780 nm after exposure to X-rays at 80 KVp.

The result on the evaluation of the panel is set forth in Table 4, in which the result on a radiation image storage panel prepared in the same manner as Example 10 except for employing the known BaFBr:0.001Eu$^{2+}$ phosphor, being given under the same conditions, is also set forth for comparison.

TABLE 4

| | Relative Sensitivity |
|---|---|
| Example 10 | 700 |
| Radiation image storage panel employing BaFBr: 0.001Eu$^{2+}$ phosphor | 100 |

EXAMPLE 11

The procedure of Example 10 was repeated except for employing the BaCl$_2$·1.9BaBr$_2$:0.001Eu$^{2+}$ phosphor obtained in Example 6 instead of BaCl$_2$·BaBr$_2$:0.001Eu$^{2+}$, to obtain a radiation image storage panel consisting essentially of a support, a phosphor layer and a transparent protective film.

The radiation image storage panels prepared in Examples 10 and 11 were measured on the intensity of afterglow at 10 sec. after terminating the exposure to X-rays at 80 KVp. The panels were also measured on the sensitivity (i.e., intensity of stimulated emission) when excited with a semiconductor laser beam (780 nm) after exposure to X-rays at 80 KVp.

The results on the evaluation of the panels are set forth in Table 5.

TABLE 5

| Example | Relative Intensity of Afterglow | Relative Sensitivity |
|---|---|---|
| 10 | 1.0 | 1.0 |
| 11 | 0.23 | 0.8 |

We claim:
1. A radiation image recording and reproducing method comprising steps of:
(i) causing a divalent europium activated alkaline earth metal halide stimulable phosphor having the formula (I):

$$M^{II}X_2 \cdot aM^{II}X'_2 : xEu^{2+} \qquad (I)$$

in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively,
   to absorb a radiation having passed through an object or having radiated from an object;
(ii) exposing said stimluable phosphor to an electromagnetic wave having a wavelength within the range of 450–1000 nm to release radiation energy stored therein as light emission; and
(iii) detecting the emitted light.
2. The radiation image recording and reproducing method as claimed in claim 1, in which a in the formula (I) is a number satisfying the condition of $0.3 \leq a \leq 3.3$.
3. The radiation image recording and reproducing method as claimed in claim 2, in which a in the formula (I) is a number satisfying the condition of $0.5 \leq a \leq 2.0$.
4. The radiation image recording and reproducing method as claimed in claim 1, in which each of X and X' in the formula (i) is Cl or Br.
5. The radiation image recording and reproducing method as claimed in claim 1, in which X and X' in the formula (I) and Cl and Br, respectively, and a in the formula (I) is a number satisfying the condition of $0.25 \leq a \leq 0.8$ or $1.2 \leq a \leq 6.0$.
6. The radiation image recording and reproducing method as claimed in claim 5, in which a in the formula (I) is a number satisfying the condition of $0.35 \leq a \leq 0.7$ or $1.4 \leq a \leq 4.0$.
7. The radiation image recording and reproducing method as claimed in claim 1, in which $M^{II}$ in the formula (I) is Ba.
8. The radiation image recording and reproducing method as claimed in claim 1, in which x in the formula (I) is a number satisfying the condition of $10^{-5} \leq x \leq 10^{-2}$.
9. The radiation image recording and reproducing method as claimed in claim 1, in which said electromagnetic wave is one having a wavelength within the range of 500–850 nm.
10. The radiation image recording and reproducing method as claimed in claim 1, in which said electromagnetic wave is a laser beam.

* * * * *